(12) United States Patent
Stoter et al.

(10) Patent No.: US 7,092,710 B1
(45) Date of Patent: Aug. 15, 2006

(54) METHOD OF AND EQUIPMENT FOR PERFORMING RADIO COMMUNICATION IN A PLURALITY OF RADIO COMMUNICATION ENVIRONMENTS

(75) Inventors: Jan Stoter, Hengelo (NL); Edwin Van Der Pol, Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/958,205

(22) PCT Filed: Apr. 4, 2000

(86) PCT No.: PCT/EP00/03038

§ 371 (c)(1),
(2), (4) Date: Jan. 25, 2002

(87) PCT Pub. No.: WO00/60771

PCT Pub. Date: Oct. 12, 2000

(30) Foreign Application Priority Data

Apr. 6, 1999 (EP) .................................. 99201072

(51) Int. Cl.
*H04Q 7/22* (2006.01)

(52) U.S. Cl. ...................... 455/437; 455/438; 455/442; 455/439; 455/453; 370/331

(58) Field of Classification Search ................ 455/465, 455/434, 436, 444, 440, 442, 524, 33.2, 54.1; 370/252, 253, 331, 332, 412
See application file for complete search history.

(56) References Cited

U.S. PATENT DOCUMENTS 5,548,808 A * 8/1996 Bruckert et al. ............ 455/442
5,640,679 A * 6/1997 Lundqvist et al. .......... 455/525
5,689,504 A * 11/1997 Hashimoto .................. 370/350
5,697,055 A * 12/1997 Gilhousen et al. .......... 455/436
5,839,070 A * 11/1998 Lupien et al. ............... 455/440
5,878,343 A * 3/1999 Robert et al. ................ 455/424
5,920,818 A * 7/1999 Frodigh et al. ............. 455/443
5,940,762 A * 8/1999 Lee et al. .................... 455/442

(Continued)

FOREIGN PATENT DOCUMENTS

DE 19736085 2/1998

(Continued)

OTHER PUBLICATIONS

Hussmann, H.; "Performance Analysis of Handover and Channel Management Schemes for Indoor Scenarios Based on Ray Tracing Techniques", Proceedings of IEEE Vehicular Technology Conference (VTC), Stockholm, Sweden, vol. 2, Jun. 8-10, 1994, pp. 843-847, XP002121343 New York.

*Primary Examiner*—Joseph Feild
*Assistant Examiner*—Julio Perez (57) ABSTRACT

A method of and equipment for performing radio communication (7) between a fixed radio access unit (5, 10, 13, 15) and a remote portable radio telecommunication unit (8) arranged for operating in accordance with a predetermined radio communication standard, such as Digital Enhanced Cordless Telecommunications (DECT), in a plurality of radio communication environments such as in the home (2), in the office (3) and/or in the public domain (4). For each radio environment (2, 3, 4) operational parmeter settings are obtained associated with system operation efficiency and communication quality of a particular environment (2, 3, 4). Radio communication (7) is performed with the operational parameter settings selected in accordance with the applicable radio environment (2, 3, 4).

20 Claims, 5 Drawing Sheets

U.S. PATENT DOCUMENTS

| | | | |
|---|---|---|---|
| 6,002,933 A * | 12/1999 | Bender et al. | 455/442 |
| 6,026,301 A * | 2/2000 | Satarasinghe | 455/436 |
| 6,278,881 B1 * | 8/2001 | Balck | 455/444 |
| 6,353,621 B1 * | 3/2002 | Boland et al. | 370/467 |
| 6,385,460 B1 * | 5/2002 | Wan | 455/515 |
| 6,535,563 B1 * | 3/2003 | Tiedemann et al. | 375/344 |
| 6,744,753 B1 * | 6/2004 | Heinonen et al. | 370/338 |
| 6,771,963 B1 * | 8/2004 | Cheng et al. | 455/437 |
| 6,788,748 B1 * | 9/2004 | Chen et al. | 375/316 |
| 6,810,254 B1 * | 10/2004 | Tiedemann et al. | 455/437 |
| 2002/0187784 A1 * | 12/2002 | Tigerstedt et al. | 455/439 |

FOREIGN PATENT DOCUMENTS

| | | | |
|---|---|---|---|
| GB | 2313740 A | | 12/1997 |
| GB | 2313740 A | * | 12/1997 |
| GB | 2316579 A | * | 2/1998 |
| WO | WO96/06512 | | 2/1996 |

* cited by examiner

METHOD OF AND EQUIPMENT FOR PERFORMING RADIO COMMUNICATION IN A PLURALITY OF RADIO COMMUNICATION ENVIRONMENTS

FIELD OF THE INVENTION

The present invention relates generally to wireless telecommunications systems, and more specifically, to radio communication equipment arranged for radio communication in several radio communication environments such as at home, in the office and/or outdoors on the street, for example.

BACKGROUND OF THE INVENTION

Wireless telecommunications systems, such as the well-known cellular and cordless telephone and data transmission systems, typically provide duplex radio communication between fixed radio access units, also called radio base stations or radio fixed parts, and remote portable radio communication units, also called portable parts. Each fixed radio access unit provides a number of radio communication channels in a geographically limited area, called a cell. Typical coverage areas are picocells (range of a few meters), nanocells (range up to 50 m) and microcells (range 10 to 400 m).

Typically, each radio access unit provides a number of radio communication channels available to the users in a cell. While moving across the coverage or service area of a radio telecommunication system, once the remote portable radio communication unit leaves the coverage area of a radio access unit, a call in progress is handed over from one radio access unit to the other dependent on a so-called handover threshold.

Channel selection and channel occupation during handover is a proces which involves a considerable amount of signalling load, whereas the speech or data transmission quality can be adversely affected if no proper channel can be selected and occupied. In the latter case, a call in progress can be severely distorted by a number of mutes or even be dropped.

International patent application WO 96/06512 discloses an improved handover procedure in a cellular mobile radio communication system, comprising a number of base stations organized into a cell structure wherein the cells are arranged in at least two layers in a hierarchical manner. There is disclosed a systematic way of passing between layers by a roaming portable radio communication unit, providing suitable handovers upwards and downwards through the cell hierarchy.

In the home or residential domain, radio communication is typically performed between a single fixed radio access unit or home base station and a few portable radio communication units, such as portable radio telephones and/or portable data equipment. The radio access unit connects to the Public Switched Telephone Network (PSTN) or an Integrated Services Digital Network (ISDN), for example.

Business radio communications systems, such as Business Cordless Telecommunications (BCT) systems, are capable of serving hundreds or even thousands of portable radio communication units by a plurality of fixed radio access units spread across (large) offices, production halls, etc. The radio access units operatively connect to a Central Interface Unit (CIU) or Radio Exchange (RE) which, in turn, connects to a Private Automatic Branch eXchange (PABX), the PSTN or the ISDN, for example.

Outdoor communications services, such as Cordless Terminal Mobility (CTM), for example, cover a whole town or city. Microcell coverage is provided by a large amount of fixed radio access units positioned across the town or city. Next to, or instead of, fixed radio access units serving such relatively small cells, fixed radio access units providing service to macrocells having a range of 1 to 5 km are applied with CTM.

Radio communications systems typically operate according to a radio communications standard, such as the pan European Global System for Mobile telecommunications (GSM), the Digital Enhanced Cordless Telecommunications (DECT) and other standards, designated AMPS, D-AMPS, ETACS, NMT, PHS, etc. Principal transmission techniques used are TDMA (Time Division Multiple Access), FDMA (Frequency Division Multiple Access) and CDMA (Code Division Multiple Access).

In particular with the availability of outdoor services, such as CTM, users will desire to use one and the same portable telecommunication unit (e.g. a portable telephone) at home, in the office and/or on the street.

An ever lasting concern with portable radio communication equipment is, however, its scarce battery power. It will be appreciated that, for being able to use one and the same portable communication device throughout the several radio environments, attention has to be paid to a reduced battery consumption, in order to maximize stand-by and operation times of the device.

SUMMARY OF THE INVENTION

Starting from WO 96/06512 being the most pertinent prior art publication, it is an object of the present invention to provide an improved method of performing radio communication between a fixed radio access unit and a remote portable radio telecommunication unit arranged for operating in accordance with a predetermined radio communication standard, such as Digital Enhanced Cordless Telecommunications (DECT), in a plurality of radio communication environments such as in the home, in the office and/or in the public domain, wherein for each radio environment operational parameter settings are obtained associated with system operation efficiency and communication quality of the environment, in a manner that an optimum between reduced battery power consumption, system load and speech and data quality is achieved.

It is also an object of the present invention to provide a fixed radio access unit, a portable radio communication unit and a radio communication system arranged for performing radio communication in accordance with the improved method of radio communication.

In a first aspect of the present invention, radio communication is performed with the operational parameter settings relating to intra-cell handover selected in accordance with the applicable radio environment.

The present invention is based on the insight that each radio communication environment has its own particular transmission characteristics such as radio propagation conditions, cell size, geographical coverage, separation of adjacent radio access units, user density, etc.

According to the method of the present invention, by establishing operational parameter settings optimally adapted to a particular radio environment, such as but not limited to channel selection rates and handover thresholds, the efficiency as to battery power consumption and communication quality can be optimized for radio communication in each environment, using the same portable communication unit.

Channel selection rate and/or channel scan rate applies in particular to radio communication systems operating in accordance with the so-called Dynamic Channel Allocation (DCA) or Dynamic Channel Selection (DCS) techniques wherein continuously, at a particular rate, the best available radio communication channel is scanned and/or selected. DCS optimizes the radio link quality between a fixed radio access unit and a portable radio communication unit. It will be appreciated that in the small office or home domain, with very few users, the channel occupation is not changing that fast as in the office domain and/or in a crowdy public environment.

Accordingly, in a further embodiment of the method according to the invention, the channel scan rate and/or channel selection rate is set lesser in the home domain compared to the office and public domains.

The decision to handover a call in progress from one access unit to another, also called intercell handover, is essentially based on received field strength measurements. If the received field strength of a further radio access unit is a threshold higher than the received field strength of the current radio access unit to which the remote portable radio communication unit connects, an intercell handover to the other radio access unit will be initiated.

In the office or business domain, wherein a plurality of fixed radio access units are active across an office, each providing service to a relatively small cell such as a nanocell or picocell, the possibilities and demand for handover will be much higher than on the streets, for example.

With a relatively low handover threshold in the office or business domain, a great amount of intercell handovers will be initiated, providing an undesired signalling and processing load to the system. However, in the public domain, if the handover threshold is too high, the field strength may drop below the level on which transmission is possible, before a handover can be initiated. Which, of course, has to be avoided.

Accordingly, in a yet further embodiment of the method according to the invention, the handover threshold is set higher in the office domain compared to the public domain.

In a preferred embodiment of the method according to the invention, the handover threshold is dynamically adapted subject to actual measured Radio Signal Strength Indication (RSSI) levels, which are field strength measurements of the received field strength at a radio access unit and/or a portable radio communication unit.

By adapting the handover threshold proportional to the measured RSSI levels, such that at a relatively high RSSI level the threshold is set likewise high, it is avoided making a handover too quickly if the radio field strength of an existing radio link is still high enough for providing communication at a set quality level. A situation which typically may occur in a business environment with overlapping radio cells.

To the contrary, on the street or the public domain, wherein cells are less overlapping, it is of advantage to set the handover threshold low if the received field strength is comparably low. In such a case once a higher field strength of another cell is encountered, handover is provided quickly before the signal strength of the radio link in progress drops below the sensitivity level.

In systems operating under GSM, D-AMPS, etc. a Power Control (PC) mode is available. That is, the transmission power of a portable radio communication unit is or can be automatically reduced if the portable is closer to the radio access unit. On the other hand, if the portable moves further away from the radio access unit, the transmission power of the portable will be automatically increased, up to its maximum. Accordingly, the PC settings, if available, likewise provide an indication concerning the actual field strength.

The number of bit errors occurred during a call in progress, generally expressed as the Bit Error Rate (BER), provides an indication of the radio link quality. A relatively high BER is an indication that the radio link and most probably the radio field strength is too low. In a frame-oriented transmission standard, such as TDMA, the number of erroneous frames, called the Frame Error Rate (FER), likewise provides a measure for the radio link quality.

Accordingly, in a yet further embodiment of the method of to the invention, the handover threshold is adapted inversely proportional to the BER and/or FER. That is, a relatively high BER and/or FER provides a relatively low handover threshold, such that handovers will be made quickly once a better radio link, i.e. a higher field strength of another radio access unit is available.

In a method according to the invention, due to the ever changing radio conditions in a particular radio environment, it is advantageous to update the operational parameter settings periodically from, measurements of system performance and/or communication quality, such as BER and/or FER measurements, if applicable.

Information as to the type of radio environment (home, office or business, public) can be transferred to the remote portable radio communication units from the fixed radio access units, such to activate the applicable operational parameter settings provided in the portable radio communication units, for example.

In an alternative embodiment in accordance with the present invention, the operational parameter settings may be provided in the fixed radio access units.

If applicable, both the radio access units and the portable radio communication units may exchange operational parameter settings.

Dynamic adaptation of parameter settings, such as adaption of the handover threshold, is in a further embodiment of the invention advantageously performed by the portable radio communication units. In particular in such communications systems, wherein the portable radio communication units decide upon handover, such as with DECT.

In a Public and Private office radio environment, such as CTM and BCT, several systems (operators) may provide service. Accordingly, next to handovers within a particular system, also called intra-system handovers, it is also feasible to provide for handover between different systems, also called inter-system handover.

Inter-system handover is more complicated and, in practice, shall not be performed that often as intra-system handover.

In a yet further embodiment of the method according to the invention, the handover threshold comprises an intra-system threshold for intra-system handover and an inter-system threshold for inter-system handover, wherein the intra-system threshold is dynamically adapted subject to measured RSSI levels and/or PC settings of radio units of the communication system through which a call is processed and wherein the inter-system threshold is dynamically adapted subject to actual measured RSSI levels and/or PC settings of radio units of a different radio communication system. Both thresholds may be set at different levels, for example, such that inter-system handover will prefer.

The invention relates further to a fixed radio access unit, such as a radio base station for performing radio communication between the fixed radio access unit and a remote portable radio communication unit operating in accordance with a predetermined radio communication standard, such as DECT, comprising storage means for storing operational parameter settings relating to intra-cell handover subject to a particular radio communication environment; i.e. the home, the office and/or the public domain.

In a yet further embodiment of the invention, the fixed radio access unit comprises means for RSSI measurement and/or PC settings, and control means arranged to initiate handover of a call if measured RSSI levels and/or PC settings differ over a threshold, wherein the control means are arranged for adaptation of the threshold subject to actual measured RSSI levels and/or PC settings in accordance with the method of the invention as disclosed above.

The invention provides further for a portable radio communication unit, such as a radio telephone, for performing radio communication between a fixed radio access unit and the portable radio communication unit operating in accordance with a predetermined radio communication standard, such as DECT, in a plurality of radio communication environments such as the home, the office and/or the public domain, wherein the portable radio communication unit comprises storage means for storing operational parameter settings relating to intra-cell handover subject to a particular radio communication environment.

In a further embodiment, the portable radio telecommunication unit according to the invention may comprise means for providing RSSI measurement and/or PC settings, and control means arranged for initiating handover of a call if measured RSSI levels and/or PC settings differ over a threshold, wherein the control means are arranged for adaptation of the threshold subject to actual measured RSSI levels and/or PC settings following the method according to the invention disclosed above.

In a radio communication arrangement according to the present invention, comprising a plurality of fixed radio access units and portable radio communication units, the portable radio communication units are arranged to operate in any of a plurality of radio communication environments, following the communication method of the invention. The radio communication arrangement may comprise a plurality of radio communication systems, and each system may be arranged for providing intra-system and inter-system handover as disclosed above.

The above-mentioned and other features and advantages of the invention are in more detail illustrated in the following description with reference to the enclosed drawings.

DETAILED DESCRIPTION OF THE EMBODIMENT

Without the intention of limitation, the invention will now be explained by its application in a cordless radio telephone system operating in accordance with the Digital Enhanced Cordless Telecommunications (DECT) standard. However, the invention is also applicable in systems operating following the Personal Handyphone System (PHS) standard or any other cordless or mobile radio communication protocol, including mobile radio communication following the Global System for Mobile communication (GSM) or any other radio communication standard.

Figure 1:
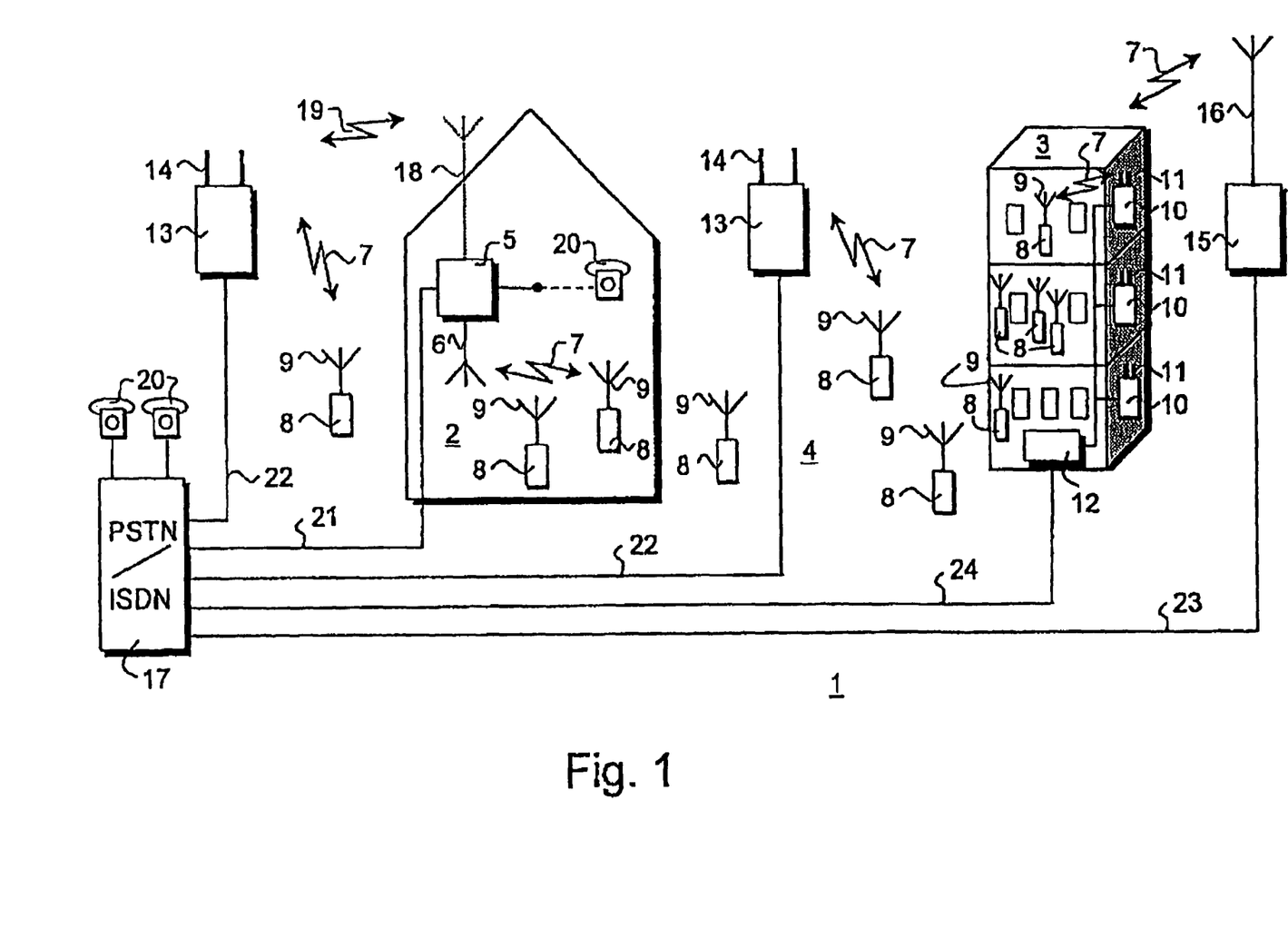
FIG. 1 shows, in a schematic and illustrative manner, a cordless radio telecommunication system, operating in different radio environments.

FIG. 1 illustrates a typical cordless radio telecommunication system 1, providing service in three different radio environments, i.e. in the residential or home domain 2, in the business or office domain 3 and on the street or the public domain 4.

In the home 2, which is also representative for a small office employing a few people, a so-called Small Office-Home Office (SOHO) radio access unit 5 is arranged, having radio interface means 6, shown in the form of an antenna. Radio communication 7 is exchanged with portable or cordless radio communication units 8 having a radio interface 9. The service area of the radio access unit 5 is typically in the nanocell range, i.e. up to 50 m.

In the office or business domain 3, the radio system comprises a plurality of radio access units 10 which connect to a Central Interface Unit (CIU) or Radio Exchange (RE) 12. Although in the figure just one radio access unit 10 per floor is shown, in practice, several radio access units 10 providing service in the nanocell range are installed at each floor of the office environment 3. The office radio access units 10 with their radio interface 11 provide radio communication 7 to a plurality of portable or cordless radio telecommunication units 8 via their radio interface 9.

In the public domain 4 radio access units 13 are installed having a radio interface 14 providing radio communication 7 with portable radio communication units 8, on the street. The public radio access units 13 typically provide coverage in the microcell range, i.e. 10 m–400 m.

In the public domain 4 a further access radio unit 15 is shown, having radio interface means 16 providing outdoor radio coverage in a microcell area, i.e. 1–5 km.

In the system 1 as shown, the radio access units 5, 13, 15 and the CIU 12 connect by fixed or wired links 21, 22, 23, 24 respectively, to a Public Switched Telephone Network (PSTN) or Integrated Service Digital Network (ISDN) 17, forming part of a fixed telephone and/or data network (not shown).

For illustrative purposes, the radio access unit 5 in the home 2 may have an additional radio interface 18, shown in the form of an antenna in dotted lines. Through this radio interface 18, the radio access unit 5 connects by a radio link 19 to a radio access unit 13 or the radio access unit 15, such that the fixed link 21 to the PSTN/ISDN 17 can be omitted. Those skilled in the art will appreciate that the radio access units 13, 15 and the CIU 12 may also connect to the PSTN/ISDN 17 through an intermediate radio link 19 and a concentrator or the like (not shown). For completeness sake, fixed communication terminals 20 connecting to the PSTN/ISDN and, if applicable, to the radio access unit 5 in the home 2 are depicted.

In the home domain 2, in general, one or two radio access unit 8 will connect at a time to the home radio access unit 5, whereas in the business or office domain 3 hundreds or even thousands of radio communication units 8 may connect to the several office radio access units 10. In the public domain 4, dependent on the crowdyness, several radio communication units 8 may connect to a radio access unit 13.

Figure 2:
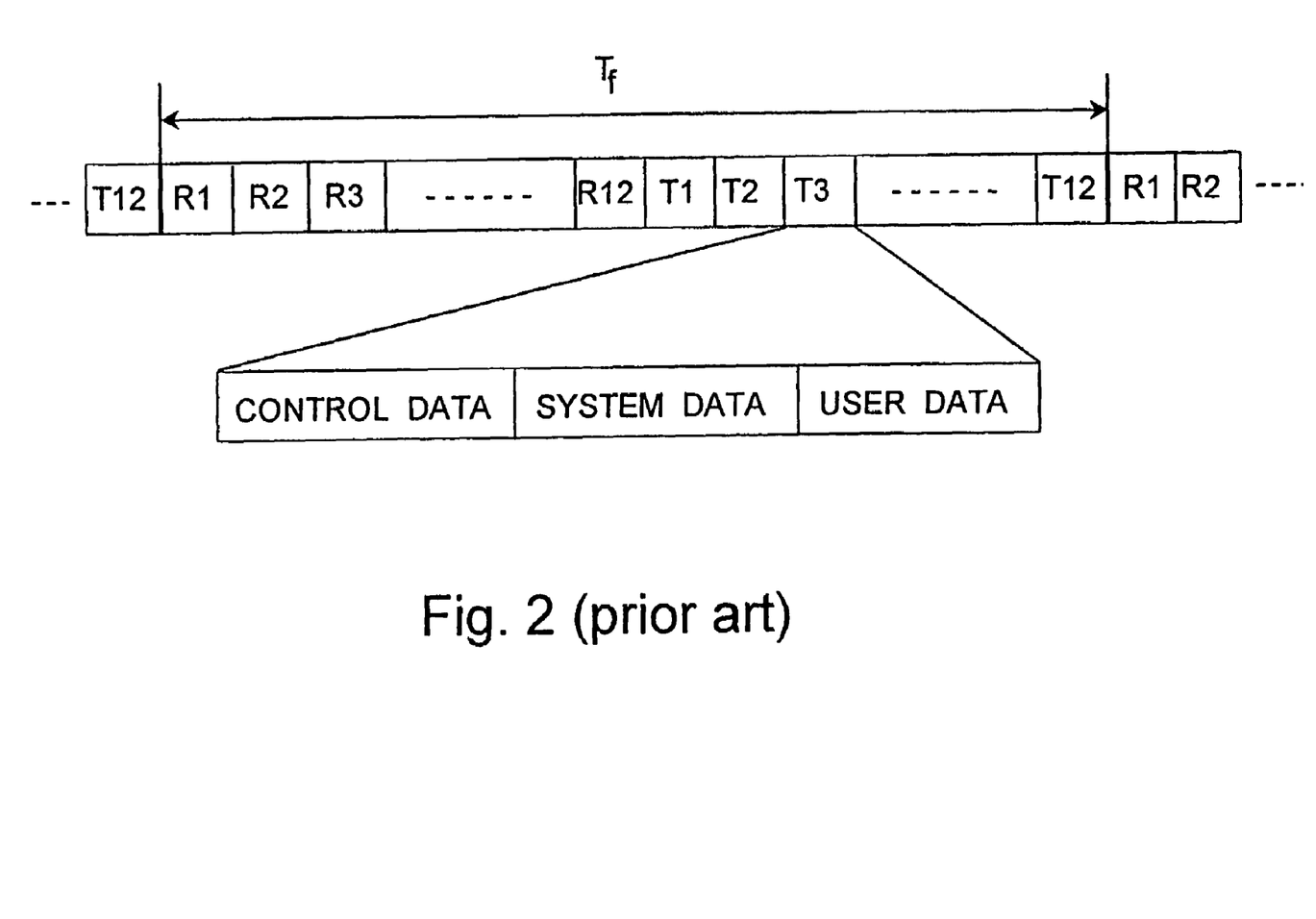
FIG. 2 shows, in a schematic and illustrative manner, a digital data stream in accordance with the Digital Enhanced Cordless Telecommunication (DECT) standard.

DECT is a Multi Carrier/Time Division Multiple Access/Time Division Duplex (MC/TDMA/TDD) digital radio access technique, providing 10 radio carriers, each divided into 24 time-slots which serve 12 duplex communication channels, called a frame and illustratively shown in FIG. 2.

During the first half of the frame $T_f$, that is the first 12 time-slots designated R1, R2, ... R12, data from the radio access units 3 are received by the cordless radio communication units 8, whereas in the second half of each frame, that is the second 12 time-slots designated T1, T2, ... T12, the remote portable radio communication units 8 transmit data to a radio access unit 5, 10, 13, 15. A duplex radio communication link 7 between a radio access unit 5, 10, 13, 15 and a remote cordless radio communication unit 8 is assigned a slot in the first half of the frame and a slot bearing the same number in the second half of the frame. Each time-slot typically containes control data, system data and information or user data, among others comprising information as to the type of radio environment (home, office, public).

The selection of a radio channel is based on the so-called Dynamic Channel Allocation (DCA) or Dynamic Channel Selection (DCS) technique, in which a free radio link or communication channel is selected amongst a plurality of radio links or communication channels common to all the radio access units 5, 10, 13, 15 and the portable or cordless radio communication units 8. In DECT, during communication, the remote radio communication units 8 scan and select the best available radio communication channel, which is also called decentralised DCA or decentralised DCS.

Change of communication channel can occur if, for example, a first portable radio communication unit being in communication with a first radio access unit at channel 1, for example, enters the service area or cell of a second radio access unit which is in communication with a second radio communication unit also at channel 1. In order to avoid interference, the second radio communication unit may proceed its communication at another channel available from the second radio access unit, such as channel 2. This type of channel handover is called "intra-cell" handover. However, it is also feasible that the communication between the first radio access unit and the first radio communication unit is handed over to the second radio access unit at a free channel thereof, which type of handover is called "inter-cell" handover. An essential parameter for establishing inter-cell handover is the received field strength at either a radio access unit and/or a portable radio communication unit. If the received field strength drops below a certain level, called the sensitivity level, inter-cell handover is required in order not to drop a call in progress. In DECT, received field strength measurements are performed by the portable radio communication units, which also decide upon initiating a handover.

The rate at which a portable radio communication unit scans its radio environment for the available radio channels, and the threshold by which the received field strength of a further radio access unit has to exceed the field strength of a radio link in progress in order to initiate handover, are typical operational parameters which vary between the different radio environments. These are also parameters which directly affect the battery power consumption of a portable radio communication unit, the signalling load in the system and the quality of a radio link, such as the speech quality.

Scanning the radio environment for available radio communication channels is a pretty power consuming operation, involving received field strength measurements processed as Radio Signal Strength Indication (RSSI) levels, updating of channel selection tables, etc. Such that the amount of battery consumption increases with an increase of the scan rate.

In an office or business environment 3, wherein a large number of radio access units 10 and portable radio communication units 8 are active, it will be appreciated that channel interferences are more likely to occur than in a relatively 'quiet' environment, such as in the home 2, wherein only a very few communication units 8 are active. By establishing an optimum setting for the channel scan rate, dependent on the particular radio environment, it will be appreciated that in the home domain 2 fewer scans have to be performed compared to the office domain 3 or the public domain 4. By setting the scan rate, according to the invention, in each environment to its optimum, scarce battery power can be saved in the home 2, for example.

The handover threshold is a further operational parameter which has different optimum values for the different radio environments, in view of efficient battery power consumption, signalling and speech quality. By setting the threshold relatively high, handovers are less likely initiated compared to a lower threshold. In the office or business environment 3, for example, with the many available radio access units 10, inter-cell handovers generally will not have to be performed too quickly if a radio communication unit 8 is moving across the service area. In view of the high number of radio communication units 10 available, the risk that a call will be dropped because the received signal strength drops quickly below the sensitivity level, is relatively small.

On the other hand, in the public domain 4, wherein the radio access units 13 generally are spaced at their maximum mutual distance in order to provide optimum radio coverage against the least installation and equipment costs, if the handover threshold is set too high, the risk that a call will be dropped near the cell borders will be relatively high. This, also because of the fact that in the public domain 4 users may move more quickly than in the business domain 3, for example.

Figure 3:
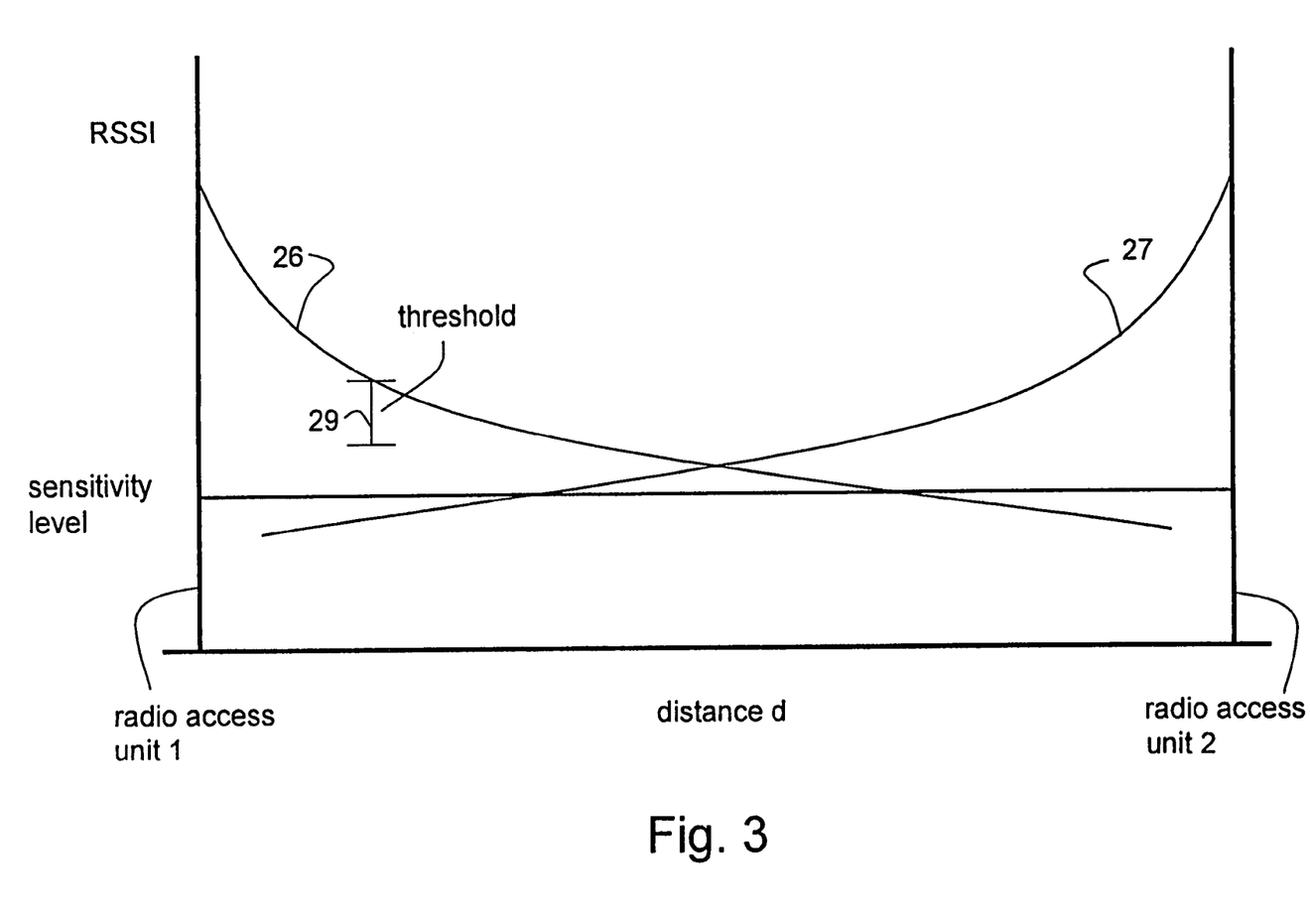
FIG. 3 shows, in a graphic representation, the relationship between Radio Signal Strength Indication (RSSI) level and handover threshold adaptation in accordance with the present invention.

FIG. 3 shows, in a graphic representation, the relationship between measured RSSI levels and distance d between a radio communication unit 8 and a radio access unit 5, 10, 13, 15. A first radio access unit positioned at the left-hand of the graph produces an RF radio signal 26. A second radio access unit positioned at the right-hand part of the graph produces an RF radio signal 27. In general, the received field strength at a moving radio communication unit 8 decreases logarithmetic with increasing distanced towards the radio access unit 5, 10, 13, 15. A moving radio communication unit needs to make a handover from the first radio access unit to the second radio access unit before the received signal strength drops below the sensitivity level 28, as indicated in FIG. 3.

The handover threshold 29 in the portable radio communication unit, as illustratively shown in FIG. 3, is set at a higher level in the business domain 3 compared to the public domain 4, to reduce the number of handovers in the business domain 3, thereby saving scarce battery power. Advantageously, it has been found that by adapting the RSSI threshold subject to actual measured RSSI levels, an optimum between speech quality and battery power savings can be achieved. This can be explained as follows.

If the RSSI level is relatively high, the handover threshold is likewise set at a relatively high level, because the risk that the received field strength drops below the sensitivity level, thereby affecting the speech quality, is relatively minor. However, if the received field strength is relatively low, as can be seen from FIG. 3, if the handover threshold is relatively high there is a considerable risk that the RSSI level drops below the sensitivity level before a handover can be initiated and performed. Accordingly, by setting the handover threshold at a low level at low RSSI levels, an inter-cell handover can be more quickly performed such that mutes in a call in progress or even dropping of the call are avoided which, of course, contributes to maintaining a required level of speech quality.

In the graph of FIG. 3, because of its mere illustrative nature, no values or quantities have been provided. Exact parameter settings depend on the actual system implementations, inter alia the communication standard used. Instead of deciding upon handover in the remote portable radio communication units, the method of the invention is likewise applicable if same is handled by a radio access unit.

In systems operating under GSM, D-AMPS, etc. a Power Control (PC) mode is available. That is, the transmission power of a portable radio communication unit is or can be automatically reduced if the portable is closer to the radio access unit. On the other hand, if the portable moves further away from the radio access unit, the transmission power will be automatically increased, up to its maximum. Accordingly, the PC settings, if available, likewise provide an indication concerning the actual field strength.

The number of bit errors which occur during the transmission of the data (see FIG. 2), expressed as the Bit Error Rate (BER) is, amongst others, a measure of the transmission quality and speech quality of a radio link. A relatively high BER implicates a bad quality radio link which, if possible, should be handed over to another cell or radio access unit. In a frame-oriented transmission standard, such as TDMA, the number of erroneous frames, called the Frame Error Rate (FER) likewise provides a measure for the radio link quality.

Accordingly, in a further embodiment of the method of the invention, the handover threshold 29 is adapted inversely proportional to measured BER and/or FER. Thus, if the BER and/or FER increases, the handover threshold is lowered. If the BER and/or FER decreases, the handover threshold may increase.

In the above, the channel scan rate, channel selection rate and handover threshold have been disclosed as operational parameters, the settings of which are varied in accordance with the radio environment. Those skilled in the art will appreciate that the teachings of the invention can be applied to other operational parameters associated with system operation efficiency and communication quality.

Information as to the type of the radio environment can be transmitted from the radio access unit to the remote portable radio communication units using the control data or system data part of a radio channel, such as shown in FIG. 2. Of course, other indications concerning the environment are applicable for the purpose of the present invention.

The environment dependent operational parameter settings can be provided in either the radio access unit, the remote portable radio communication unit or both. In DECT, it is advantageous to have the parameter settings in the cordless radio communication unit, which also provides for handover and channel scanning. If available in the radio access unit, the parameter settings can be exchanged between the units, if required. Updating of the settings can be likewise performed in either the radio access unit, the portable radio communication unit or both.

In a multi-system environment, parameter settings applicable to each system can be separately provided and my differ between the systems. Identification as to a particular system can be likewise provided through the control data or system data exchange between the radio units of a system. In a preferred embodiment of the invention, the parameter settings, such as inter-system handover threshold and intra-system threshold may be dynamically adapted independently of each of the communication systems.

Figure 4:
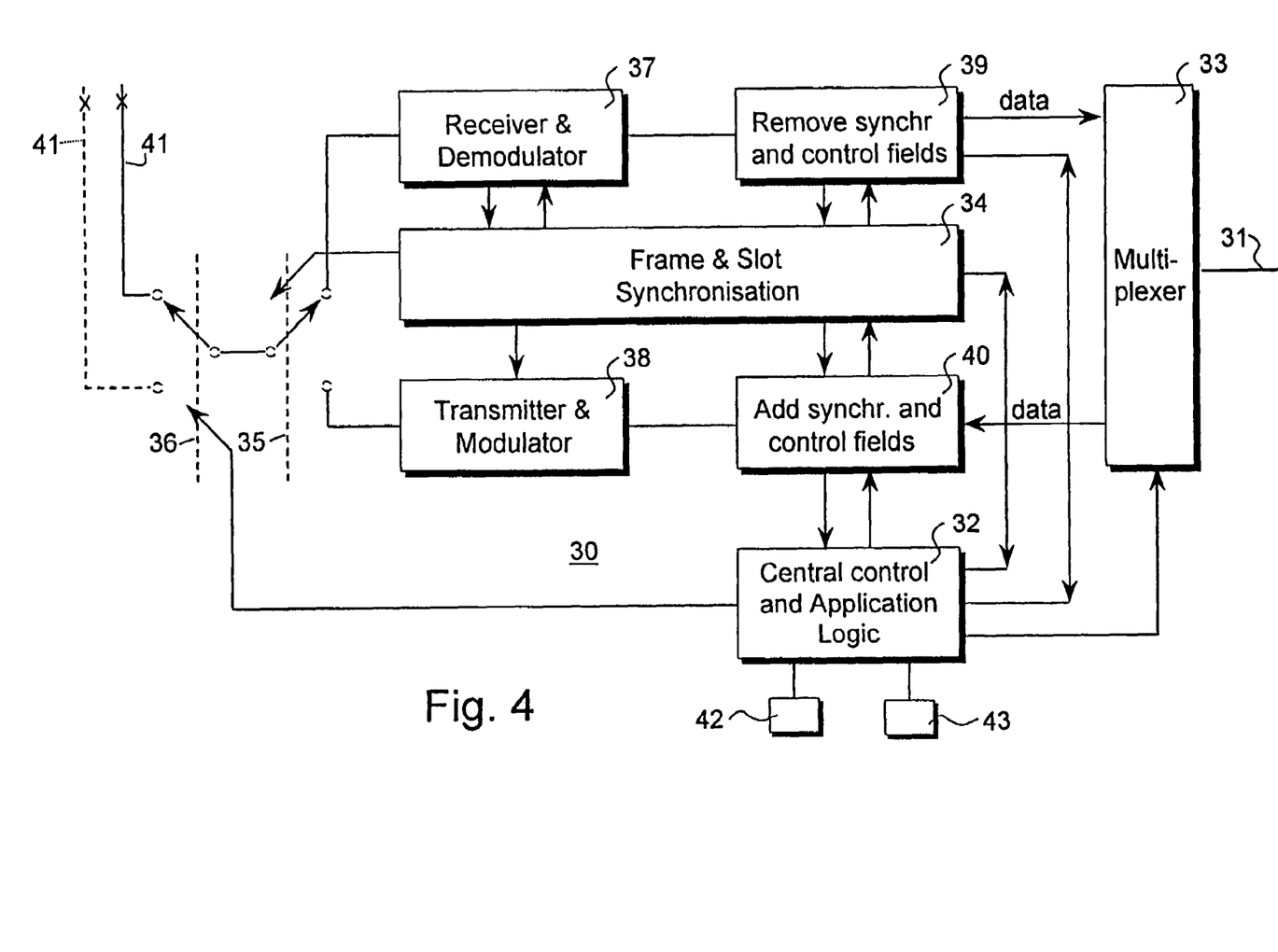
FIG. 4 shows a simplified block diagram of a radio access unit operating in accordance with the present invention.

FIG. 4 shows a block diagram of a radio access unit 30 which operates in accordance with the DECT standard. The access unit 30 has a wired connection 31 to a radio exchange 12 shown in FIG. 1. Central control and application logic 32 detects incoming calls and controls outgoing calls and select suitable combinations of carrier and time slots in accordance with the DCA/DCS algorithm. The different connections and time slots are merged via a multiplexer 33. The radio access unit 30 has a frame and slot synchronisation unit 34 which controls slot reception and transmission timing. The central control logic 32 also controls a Transmit/Receive (T/R) switch 35 and an antenna diversity switch 36, if antenna diversity is implemented, and BER and/or FER.

With antenna diversity, if a radio connection provides bad communication, the control logic first tries another of the antennas 41 before changing the radio communication channel.

The radio interface of the access unit 30 consists of a receiver/demodulator 37 and a transmitter/modulator 38. Synchronisation and control information is stripped from received data by unit 39, whereas such information is added to the data to be transmitted by unit 40, connected as shown. The receiver/demodulator 37 may comprise means for RSSI measurement and PC mode settings, if applicable.

Block 42 schematically indicates means arranged for adapting operational parameter settings which may be stored in storage means 43 in the radio access unit 30.

Figure 5:
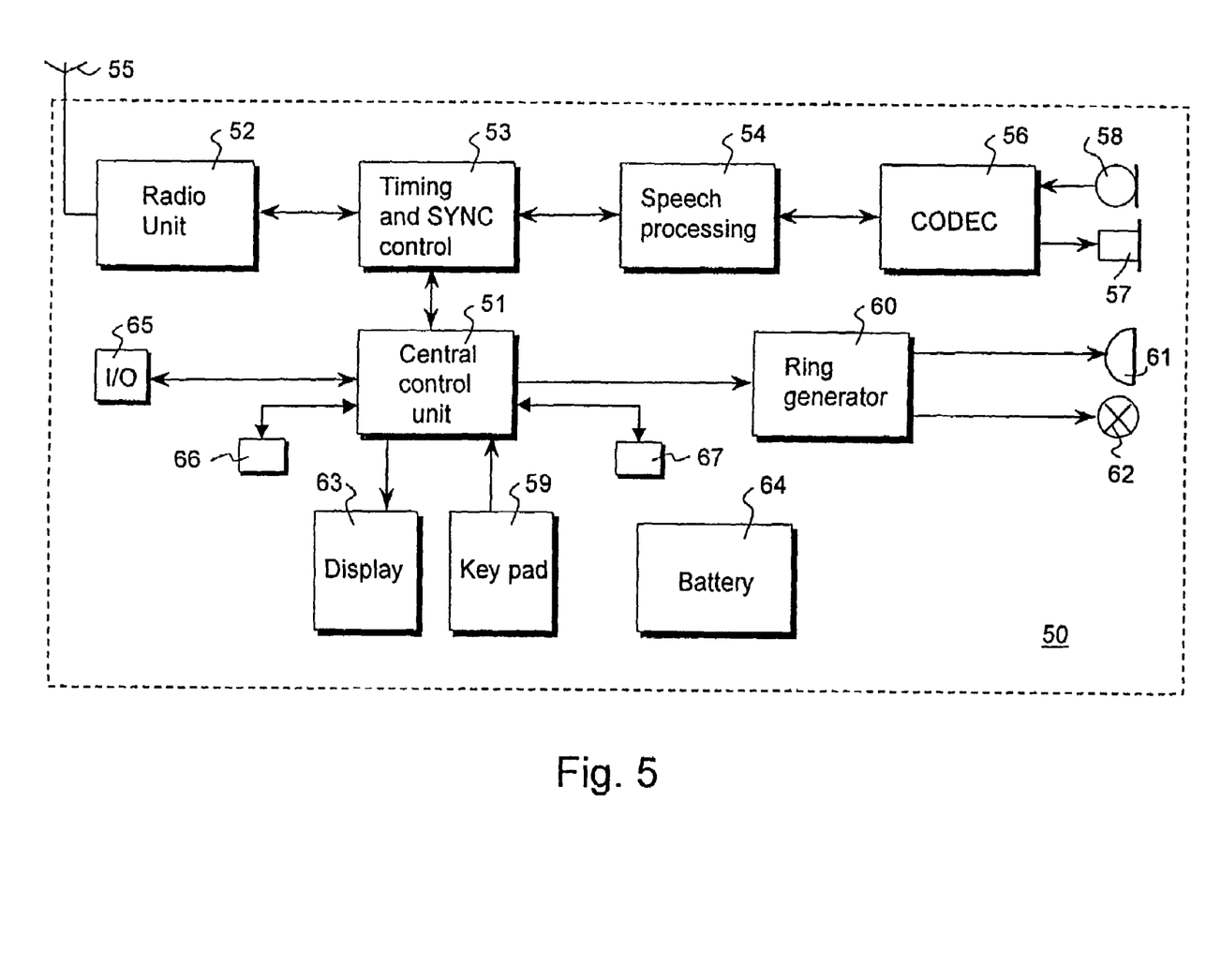
FIG. 5 shows a simplified block diagram of a portable radio communication unit taking the form of a portable radio telephone in accordance with the present invention.

FIG. 5 shows a simplified block diagram of a radio telephone set comprising frequency or clock circuitry according to the present invention. The radio telephone set 50 has four essential building blocks, i.e. a central control and application logic unit 51, a radio unit 52, a timing and synchronisation control unit 53 and a speech processing unit 54.

The radio unit 52 comprises an air interface 55 having an antenna system coupled to a transceiver unit comprising a transmitter/modulator and a receiver/demodulator and means for RSSI measurement and PC mode settings, if applicable.

The timing and synchronisation control unit 53 receives data over the air interface 55 and the radio unit 52 from a radio access unit 5, 10, 13, 15 (FIG. 1), which data are processed in accordance with the system clock timing provided by the radio exchange 12 (FIG. 1). Signalling and synchronisation information are removed from the received data by the unit 53 and received speech data are fed to the speech processing unit 54. The speech processing unit 54, among others, takes care of the deciphering of received data. A codec 56 decodes the received digitised speech data into a form for making it audible to a user of the handset via a loudspeaker 57 connected to the codec 56.

Speech produced by the user is received by a microphone 58 and encoded into a suitable digital format by the codec 56. This encoded speech data is fed to the speech processing 54 which, among others, takes care of encryption of the speech data. The timing and synchronisation control unit 53 adds suitable synchronisation and signalling information to the encrypted speech data. The radio unit 52 transmits this signalling and speech data via the air interface 55 for reception by a radio access unit of the communication system to which the telephone set 50 is operatively connected.

The central control unit and application logic unit 51 comprises a microprocessor or microcontroller and memory means, and connects to the timing and synchronisation control unit 53. The central control unit 51 essentially controls the system data and the communication with the user of the radio telephone set 50 via a keypad means 59, display means 63 and ring generator means 60, all connected to the central control unit 51, as well as BER and/or FER. Further, an external interface 65 connects to the central control unit 51 for external control and data processing purposes. Frame and time slots allocation and, in the case of a multi-carrier multi-slot technology such as DECT, also the various combinations of carrier frequencies and time-slots are controlled by the central control unit 51 and stored in the memory means.

The ring generator 60 connects to a buzzer 61 for producing a ringing or alerting sound at the arrival of a call. Optionally a visual alerting signal may be emitted by a lamp or Light Emitting Diode (LED) 62, connected as shown. The display means 63, such as an LCD device, are operatively connected to the central control unit 51 for displaying call information and other user and system data.

For the overall powering of the telephone set 50 a battery and powering unit 64 is included.

Block 66 schematically indicates means arranged for adapting operational parameter settings which may be stored in storage means 67 in the radio telephone set 50.

Although the present invention is generally illustrated with respect to a DECT radio telephone communication system, it is not restricted thereto. The present invention can be used with other communication devices, such as data communication equipment, as well as in other wireless multicell communication system.

The invention claimed is:

1. A method of performing radio communication between a fixed radio access unit in a cellular radio communication system and a remote portable radio telecommunication unit that roams between areas having different radio communication characteristics, said method comprising:

detecting by the fixed radio access unit, that the portable unit has entered a new area having different radio communication characteristics than a previous area where the portable unit was operating; and sending a message from the fixed radio access unit to the portable unit providing the portable unit with information related to operational parameter settings corresponding to the radio communication characteristics in the new area that the portable unit has entered, said operational parameter settings including at least one of channel scan rate, channel selection rate, and handover threshold signal strength, said operational parameter settings causing the portable unit to change its operating characteristics in a manner that optimizes radio communication performance of the portable unit within the new area where the portable unit is operating.

2. The method of claim 1, wherein the step of sending a message from the fixed radio access unit to the portable unit includes sending a message that provides the portable unit with the operational parameter settings corresponding to the radio communication characteristics in the new area where the mobile unit is currently operating.

3. The method of claim 1, wherein the step of sending a message from the fixed radio access unit to the portable unit includes sending a message that provides the portable unit with information that enables the portable unit to select the operational parameter settings corresponding to the radio communication characteristics in the new area where the mobile unit is currently operating.

4. The method of claim 1, wherein the operational parameter settings cause the portable unit to perform intercell handovers in a manner that optimizes radio communication performance of the portable unit.

5. The method of claim 1, wherein the operational parameter settings cause the portable unit to perform channel reselection in a manner that optimizes radio communication performance of the portable unit.

6. The method of claim 1, further comprising periodically updating the operational parameter settings based on measured radio communication performance.

7. The method of claim 1, wherein the channel scan rate and/or channel selection rate is set to a lower threshold in an area where a channel occupation change rate is lower.

8. The method of claim 1, wherein the handover threshold is set higher in an area where there is a greater number of handover requests.

9. The method of claim 1, wherein the handover threshold is dynamically adapted based on actual measured Radio Signal Strength Indication levels and/or Power Control settings of the portable unit.

10. The method of claim 9, wherein the handover threshold is adapted inversely proportional to measured Bit Error Rate and/or Frame Error Rate.

11. The method of claim 10, wherein the measurement and threshold adaptation is performed by the portable unit.

12. The method of claim 1, wherein the handover threshold includes an intra-system threshold for handovers within the cellular radio communication system, and an inter-system threshold for handovers to a different radio communication system, wherein:

the intra-system threshold is dynamically adapted based on measured Radio Signal Strength Indication (RSSI) levels and/or Power Control (PC) settings of portable units operating within the cellular radio communication system, and the inter-system threshold is dynamically adapted subject to measured RSSI levels and/or PC settings of portable units operating within a different cellular radio communication system.

13. A fixed radio access unit in a cellular radio communication system, said fixed radio access unit performing radio communication with a remote portable radio communication unit operating in accordance with a predetermined radio communication standard, said fixed radio access unit comprising:

storage means for storing operational parameter settings corresponding to radio communication characteristics in different areas within a service area of the cellular radio communication system;

means for detecting by the fixed radio access unit, that the portable unit has entered a new area having different radio communication characteristics than a previous area where the portable unit was operating; and means for sending a message from the fixed radio access unit to the portable unit, said message providing the portable unit with information related to operational parameter settings corresponding to the radio communication characteristics in the new area that the portable unit has entered, said operational parameter settings including at least one of channel scan rate, channel selection rate, and handover threshold signal strength, said operational parameter settings causing the portable unit to change its operating characteristics in a manner that optimizes radio communication performance of the portable unit within the new area where the portable unit is operating.

14. The fixed radio access unit of claim 13, wherein the means for sending a message from the fixed radio access unit to the portable unit includes means for sending a message that provides the portable unit with the operational parameter settings corresponding to the radio communication characteristics in the new area where the mobile unit is currently operating.

15. The fixed radio access unit of claim 13, wherein the means for sending a message from the fixed radio access unit to the portable unit includes means for sending a message that provides the portable unit with information that enables the portable unit to select the operational parameter settings corresponding to the radio communication characteristics in the new area where the mobile unit is currently operating.

16. The fixed radio access unit of claim 13, wherein the operational parameter settings cause the portable unit to perform handovers and channel reselection in a manner that optimizes radio communication performance of the portable unit.

17. A portable radio communication unit in a cellular radio communication system, said portable unit performing radio communication with a fixed radio access unit operating in accordance with a predetermined radio communication standard, said portable unit comprising:
    means for storing operational parameter settings corresponding to radio communication characteristics in different areas within a service area of the cellular radio communication system;
    means for receiving a message from the fixed radio access unit when the portable unit enters a new service area, said message providing the portable unit with information related to operational parameter settings corresponding to radio communication characteristics in the new area that the portable unit has entered, said operational parameter settings including at least one of channel scan rate, channel selection rate, and handover threshold signal strength; and
    means for utilizing the information from the fixed radio access unit to select the operational parameter settings optimize radio communication performance of the portable unit within the new area that the portable unit has entered.

18. The portable radio communication unit of claim 17, wherein the operational parameter settings cause the portable unit to perform handovers and channel reselection in a manner that optimizes radio communication performance of the portable unit.

19. The portable radio communication unit of claim 18, further comprising:
    means for measuring Radio Signal Strength Indication (RSSI) levels and/or Power Control (PC) settings of the portable unit; and
    means for adapting the operational parameter settings based on measured RSSI levels and/or PC settings of portable unit.

20. A cellular radio communication system having a service area in which radio communication characteristics differ in different areas within the service area, said system comprising:
    a fixed radio access unit performing radio communication with a remote portable radio communication unit operating in accordance with a predetermined radio communication standard, said fixed radio access unit comprising:
        means for detecting that the portable unit has entered a new area having different radio communication characteristics than a previous area where the portable unit was operating; and
        means for sending a message to the portable unit in response to detecting that the portable unit has entered the new area, said message providing the portable unit with information related to operational parameter settings corresponding to the radio communication characteristics in the new area that the portable unit has entered, said operational parameter settings including at least one of channel scan rate, channel selection rate, and handover threshold signal strength; and
    a portable radio communication unit, comprising:
        storage means for storing operational parameter settings corresponding to radio communication characteristics in the different areas within the service area of the cellular radio communication system;
        means for receiving the message from the fixed radio access unit; and
        means for utilizing the operational parameter settings to operate the portable unit in a manner that optimizes radio communication performance of the portable unit within the new area that the portable unit has entered.

* * * * *